United States Patent
Dusija et al.

(10) Patent No.: US 10,372,342 B2
(45) Date of Patent: Aug. 6, 2019

(54) MULTI-LEVEL CELL SOLID STATE DEVICE AND METHOD FOR TRANSFERRING DATA BETWEEN A HOST AND THE MULTI-LEVEL CELL SOLID STATE DEVICE

(71) Applicant: Western Digital Technologies, Inc., San Jose, CA (US)

(72) Inventors: Gautam Ashok Dusija, Burlingame, CA (US); Mrinal Kochar, San Jose, CA (US); Matthew Davidson, Los Altos, CA (US)

(73) Assignee: WESTERN DIGITAL TECHNOLOGIES, INC., San Jose, CA (US)

( * ) Notice: Subject to any disclaimer, the term of this patent is extended or adjusted under 35 U.S.C. 154(b) by 0 days.

(21) Appl. No.: 15/722,989

(22) Filed: Oct. 2, 2017

(65) Prior Publication Data

US 2019/0102083 A1    Apr. 4, 2019

(51) Int. Cl.
*G06F 3/06* (2006.01)
*G06F 12/123* (2016.01)

(52) U.S. Cl.
CPC .............. *G06F 3/061* (2013.01); *G06F 3/065* (2013.01); *G06F 3/0659* (2013.01); *G06F 3/0679* (2013.01); *G06F 12/123* (2013.01)

(58) Field of Classification Search
CPC ........ G06F 3/061; G06F 3/065; G06F 12/123; G06F 3/0679; G06F 3/0659
See application file for complete search history.

(56) References Cited

U.S. PATENT DOCUMENTS

| | | | |
|---|---|---|---|
| 2013/0173844 A1* | 7/2013 | Chen | G06F 12/0246 711/103 |
| 2017/0277476 A1* | 9/2017 | Shin | G06F 3/0673 |
| 2018/0032275 A1* | 2/2018 | Pahwa | G06F 3/0649 |
| 2018/0081543 A1* | 3/2018 | Muchherla | G06F 3/0604 |
| 2018/0211708 A1* | 7/2018 | Igahara | G11C 16/105 |

* cited by examiner

*Primary Examiner* — Jerome Leboeuf
(74) *Attorney, Agent, or Firm* — Loza & Loza, LLP; Gabriel Fitch (57) ABSTRACT

Systems and methods for storing data in a multi-level cell (MLC) flash memory are disclosed. One such data storage system has a data path with cascaded data access performance, including multiple storage portions having different data access speeds. A cascaded data path enables flash memory data access that has a more graceful degradation instead of an abrupt decrease in performance during operation.

18 Claims, 9 Drawing Sheets

MULTI-LEVEL CELL SOLID STATE DEVICE AND METHOD FOR TRANSFERRING DATA BETWEEN A HOST AND THE MULTI-LEVEL CELL SOLID STATE DEVICE

FIELD

Aspects of the disclosure relate generally to solid state storage devices, and more specifically, to solid state drives utilizing multi-level cell (MLC) flash memory.

BACKGROUND

In a variety of consumer electronics and computers, solid state drives incorporating non-volatile memories (NVMs) are frequently replacing or supplementing conventional rotating hard disk drives for mass storage. A solid state drive (SSD) or solid state storage may use negative-AND (NAND) flash memory cells for its high density and low cost per cell relative to other generally available non-volatile memory technology. Each NAND memory cell can be programmed to store one or more bit. A single level cell (SLC) flash memory may be programmed to store one bit per cell. Some flash memory may have cells that can store two or more bits per cell. This type of flash memory is generally referred to as multi-level cell (MLC) flash memory. Some specific examples are triple-level cell (TLC) flash memory that can store 3 bits per cell and quad-level cell (QLC) flash memory that can store 4 bits per cell. In general, more read and write cycles are used to access data in NAND flash memory configured to store more bits per cell.

SUMMARY

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

Aspects of the disclosure provide systems and methods for storing data in a multi-level cell (MLC) flash memory that has a data path with cascaded data access performance.

One embodiment provides a method of operating a solid state drive. The method stores a first number of bits per cell in a first portion of a non-volatile memory (NVM). The method further stores a second number of bits per cell, less than the first number of bits, in a second portion of the NVM. The method receives a command from a host to transfer data between the host and the NVM. Then the method transfers data between the host and the NVM via at least one of a single level cell (SLC) buffer of the NVM or the second portion of the NVM, based on the command.

Another embodiment provides a solid state device (SSD) that includes a non-volatile memory (NVM) including a single level cell (SLC) buffer, and a controller operatively coupled to the NVM. The controller is configured to store a first number of bits per cell in a first portion of NVM. The controller is further configured to store a second number of bits per cell, less than the first number of bits, in a second portion of the NVM. The controller is configured to receive a command from a host to transfer data between the host and the NVM; and transfer data between the host and the NVM via at least one of the SLC buffer or the second portion of the NVM, based on the command.

Another embodiment provides a solid state drive (SSD). The SSD includes means for accessing a non-volatile memory (NVM) including a first portion configured to store a first number of bits per cell, and a second portion configured to store a second number of bits per cell less than the first number of bits. The SSD further includes means for receiving a command from a host to transfer data between the host and the NVM. The SSD further includes means for transferring data between the host and the NVM via at least one of a single level cell (SLC) buffer of the NVM or the second portion of the NVM, based on the command.

DETAILED DESCRIPTION

Referring now to the drawings, systems and methods for storing data in a multi-level cell (MLC) flash memory are illustrated. In the illustrated embodiments, negative-AND (NAND) flash memory is used to illustrate the methods for providing a data path with cascaded data access performance A data path is called a cascaded data path with cascaded data access performance. In some embodiments, a cascaded data path of a NAND flash memory is configured such that its data access performance has a more graceful degradation instead of an abrupt decrease in performance during operation.

Figure 1:
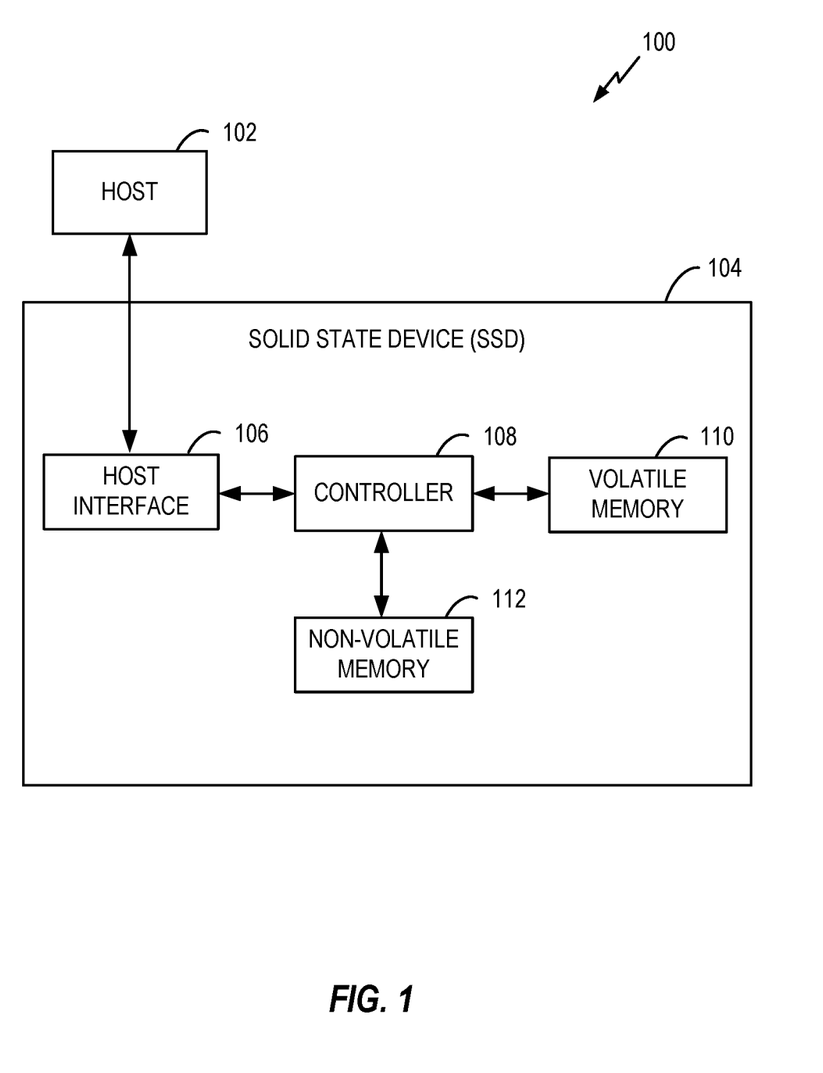
FIG. 1 is a diagram illustrating a computing system that can perform various functions in accordance with some embodiments of the disclosure.

FIG. 1 is a block diagram illustrating a computing system that can perform various functions in accordance with some embodiments of the disclosure. The system 100 includes a host 102 and a solid state device (SSD) 104 coupled to the host 102. The host 102 provides various commands to the SSD 104 for transferring data between the host 102 and the SSD 104. For example, the host 102 may provide a write command to the SSD 104 for writing or programming data to the SSD 104, or a read command to the SSD 104 for reading or retrieving data from the SSD 104. The host 102 may be any system or device having a need for data storage or retrieval and a compatible interface for communicating with the SSD 104. For example, the host 102 may a computing device, a personal computer, a portable computer, a workstation, a server, a personal digital assistant, a digital camera, a digital phone, or the like.

In some embodiments, the SSD 104 includes a host interface 106, a controller 108, a volatile memory 110, and a non-volatile memory (NVM) 112. One example of NVM is NAND flash memory or the like. The host interface 106 is coupled to the controller 108 and facilitates communication and data transfer between the host 102 and the controller 108. Additionally, the controller 108 is operatively coupled to the volatile memory 110 and the NVM 112. The host interface 106 may be any type of communication interface, such as an Integrated Drive Electronics (IDE) interface, a Universal Serial Bus (USB) interface, a Serial Peripheral (SP) interface, an Advanced Technology Attachment (ATA) interface, a Small Computer System Interface (SCSI), an IEEE 1394 (Firewire) interface, a Peripheral Component Interconnect Express (PCIe) interface, a Common Flash Memory Interface (CFI), a Non-Volatile Memory Express (NVMe) interface, or the like. In some embodiments, the host 102 and the SSD 104 may be included in a same unit or system. In other embodiments, the SSD 104 may be remote with respect to the host 102 or may be contained in a remote computing system in data communication with the host 102. For example, the host 102 may communicate with the SSD 104 through a wired and/or wireless communication link. In some examples, the SSD 104 may be included in a network based storage system.

The controller 108 controls the operation of the SSD 104. In various embodiments, the controller 108 receives commands from the host 102 through the host interface 106 and performs the commands to transfer data between the host 102 and the NVM 112. The controller 108 may be implemented as any type of processing device, such as a microprocessor, a microcontroller, an embedded controller, a logic circuit, software, firmware, or the like, for controlling the operation of the SSD 104. In one embodiment, the controller 108 can be a special purpose controller specifically configured/programmed to perform any of the functions contained within the application.

In some embodiments, some or all of the functions described herein as being performed by the controller 108 may instead be performed by another element of the SSD 104. The functions of the host interface 106 and the controller 108 may be implemented in the same device. For example, the SSD 104 may include a microprocessor, a microcontroller, an embedded controller, a logic circuit, a field-programmable gate array (FPGA), an application-specific integrated circuit (ASIC), software, firmware, or any kind of processing device, for performing one or more of the functions described herein as being performed by the controller 108 and/or host interface 106. In some embodiments, one or more of the functions described herein as being performed by the controller 108 and/or host interface 106 are instead performed by the host 102. In some embodiments, some or all of the functions described herein as being performed by the controller 108 may instead be performed by another element such as a controller in a hybrid drive including both non-volatile memory elements and magnetic storage elements. In some embodiments, some or all of the functions described herein as being performed by the controller 108 may instead be performed by control circuitry included in the NVM 112.

The volatile memory 110 may be any memory, computing device, or system capable of storing data. The volatile memory 110 can maintain its data while the device is powered or energized. For example, the volatile memory 110 may be a random-access memory (RAM) such as a dynamic random-access memory (DRAM), a static random-access memory (SRAM), a synchronous dynamic random-access memory (SDRAM), or the like. In various embodiments, the controller 108 uses the volatile memory 110, or a portion thereof, to store data during the transfer of data between the host 102 and the NVM 112. For example, the volatile memory 110 may be a cache memory that may be used to store recently accessed data to improve access speed of the SSD 104. In some embodiments, the SSD 104 may not include the volatile memory 110.

The controller 108 can control writing data to and reading data from the NVM 112. The NVM 112 may include one or more types of non-volatile data storages, such as a flash storage system, a solid state drive, a flash memory card, a secure digital (SD) card, a universal serial bus (USB) memory device, a CompactFlash card, a SmartMedia device, a flash storage array, a flash storage, an erasable programmable read-only-memory (EPROM), an electrically erasable programmable read-only-memory (EEPROM), magnetoresistive random-access memory, non-volatile RAM, ferroelectric RAM, or phase-change RAM, or the like.

Figure 2:
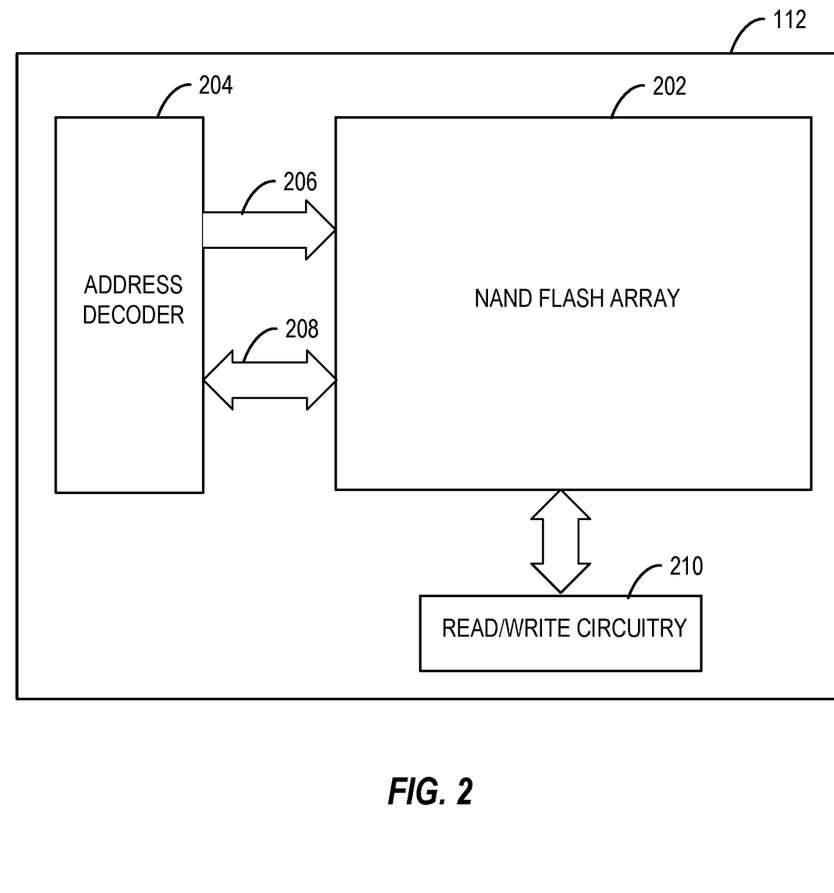
FIG. 2 is a conceptual block diagram of a non-volatile memory (NVM) in accordance with one embodiment of the disclosure.

FIG. 2 is a conceptual block diagram of the NVM 112 implemented by NAND flash memory in accordance with some embodiments of the disclosure. In this example, the NVM 112 includes a NAND flash memory array 202 that includes a plurality of memory cells or devices. The NVM 112 may include an address decoder 204 for addressing the NAND flash memory array 202 by selecting one or more wordlines and bit lines 206 connected to the desired cells. Therefore, data 208 may be written or read to/from the memory array 202. The NVM 112 may include a read-write circuitry 210 that is configured to generate various signals (e.g., voltages and/or currents) for writing, programming, reading, erasing, and/or refreshing the memory cells of the NAND flash array 202. The read-write circuitry 210 may also be configured to sense, detect, and determine the voltage and/or current of each cell of the flash array 202 to program data to and read data from the cells. Each of the memory cells may be programmed to a certain program state among a number of program states or levels. Each state can correspond to a specific binary value. For example, a cell can store an integer number B of bits when it is capable of being programmed to one of $2^B$ discrete program states or levels.

The read-write circuitry 210 may store data received from the host 102 or controller 108 in one or more predetermined pages each including multiple memory cells. When the host reads data (e.g., a file) from the NVM 112, the controller 108 and/or the read-write circuitry 210 can determine the page that stores the requested data, and the read-write circuitry 210 can generate the correct signals (e.g., read threshold voltage(s)) to read the data from that page. In some embodiments, the read-write circuitry 210 or its functions may be included in the controller 108. The read-write circuitry 210 may include buffers for storing data to be programmed to or read from the flash array 202.

The NAND flash array 202 may be implemented using QLC flash memory. As compared to SLC and TLC flash memory, reading and writing QLC flash memory is slower than that of SLC and TLC flash memory. In general, reading a flash memory cell involves measuring the flow of electricity through the cell. One or more reference or threshold voltages are applied across the cell (e.g., source and drain electrodes) and the current across the cell is measured. Possible binary values for SLC are 0 or 1, using one threshold voltage. Possible binary values for MLC are 00, 10, 01, or 11, using three threshold voltages. Possible binary values for TLC are 000, 001, 010, 011, 100, 101, 110, 111, using seven threshold voltages. Possible binary values for QLC are 0000, 0001, 0010, 0011, 0100, 0101, 0110, 0111, 1000, 1001, 1010, 1011, 1100, 1101, 1110, 1111, using 15 threshold voltages.

Each binary value corresponds to a specific threshold voltage. For example, the lowest binary value may correspond to the highest voltage, the highest binary value may correspond to the lowest voltage, and intermediate binary values correspond to progressively different threshold voltages between the highest and lowest voltages. The correct threshold voltage for the stored binary value is set in the writing (program) process. To read a flash cell, the threshold voltage may be applied successively, with a different threshold voltage being applied each time. Therefore, the more states a cell has, the more threshold voltage tests need be performed to read the stored data. For example, three threshold voltage tests are used to read a TLC flash cell, and only one test is needed to read a SLC flash cell. It takes fifteen threshold voltage tests to read a QLC flash cell. Similarly, program and erase time increases when a cell stores more bits per cell (e.g., QLC).

Each time a flash cell is reprogrammed or written, the cell may suffer from gate wear that causes the cell to fail eventually after a certain number of program-erase cycles. This means that QLC flash cells may fail earlier than TLC/SLC flash cells, because more program-erase cycles are needed to write data to QLC flash cells. However, QLC flash memory offers higher density and lower cost per bit than a SLC/TLC flash memory. To increase the endurance and/or speed of a QLC flash cell, it can be operated, accessed, or configured to act like a SLC flash cell (pseudo SLC cell) or TLC flash cell (pseudo TLC cell). In one example, a pseudo TLC (pTLC) flash cell can be a QLC flash cell configured such that instead of having sixteen states per cell, the read-write circuitry 210 can effectively ignore eight states, so that each cell is only programmed to one of the remaining eight effective states.

Figure 3:
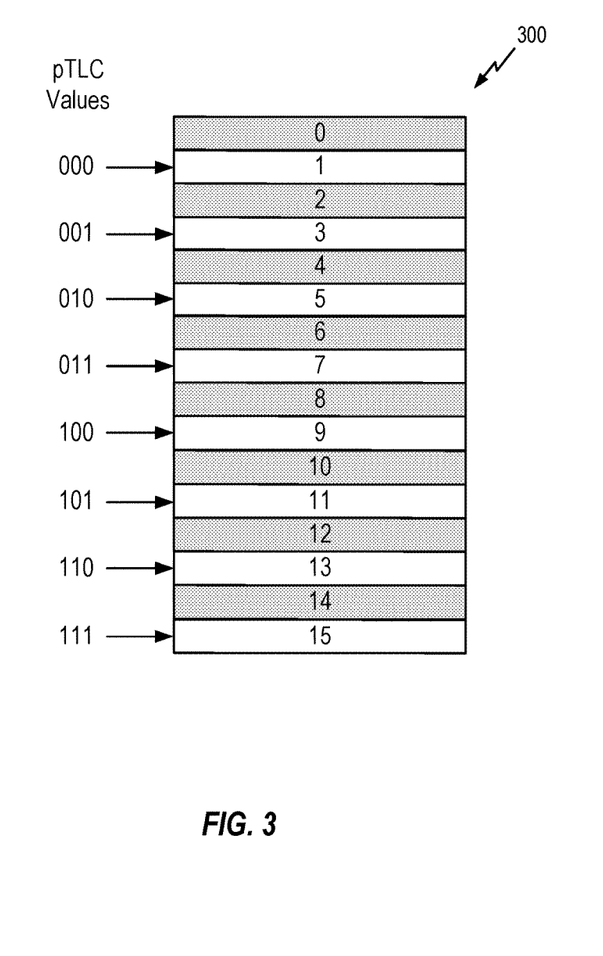
FIG. 3 is a conceptual diagram illustrating an example of operating a quad-level cell (QLC) in a pseudo triple-level cell (pTLC) mode in accordance with one embodiment of the disclosure.

FIG. 3 is a conceptual diagram illustrating an example of operating a QLC flash cell 300 in a pseudo TLC (pTLC) mode according to one embodiment. The QLC flash cell 300 may be a memory cell included in the NAND flash array 202. The QLC flash cell 300 may be programmed to one of sixteen states (states 0 through 15) for storing a binary value from 0000 through 1111. Each state corresponds to a different threshold voltage. For example, the binary value 0000 can be stored at a state (e.g., state 0) with the highest threshold voltage. The binary value 0001 can be stored at a state (e.g., state 1) with next highest voltage and so on. The binary value 1111 can be stored at a state (e.g., state 15) with the lowest threshold voltage.

To access the QLC flash cell 300 in pTLC mode, the read-write circuitry 210 can store 3 bits in the QLC flash cell 300 by using only some of the sixteen states and ignore the other states. For example, the read-write circuitry 201 can store a 3-bit binary value using only eight states (e.g., states 1, 3, 5, 7, 9, 11, 13, and 15) and ignore the other eight states. In other embodiments, other subset of states may be used to store 3 bits. Using pTLC mode, 3 bits can be stored in the QLC flash cell 300 with fewer program cycles than storing a 4-bit value. When operating the QLC flash cell 300 in pTLC mode, data access (e.g., read and write) performance can be increased because fewer read and/or program cycles are needed to access the data.

Figure 4:
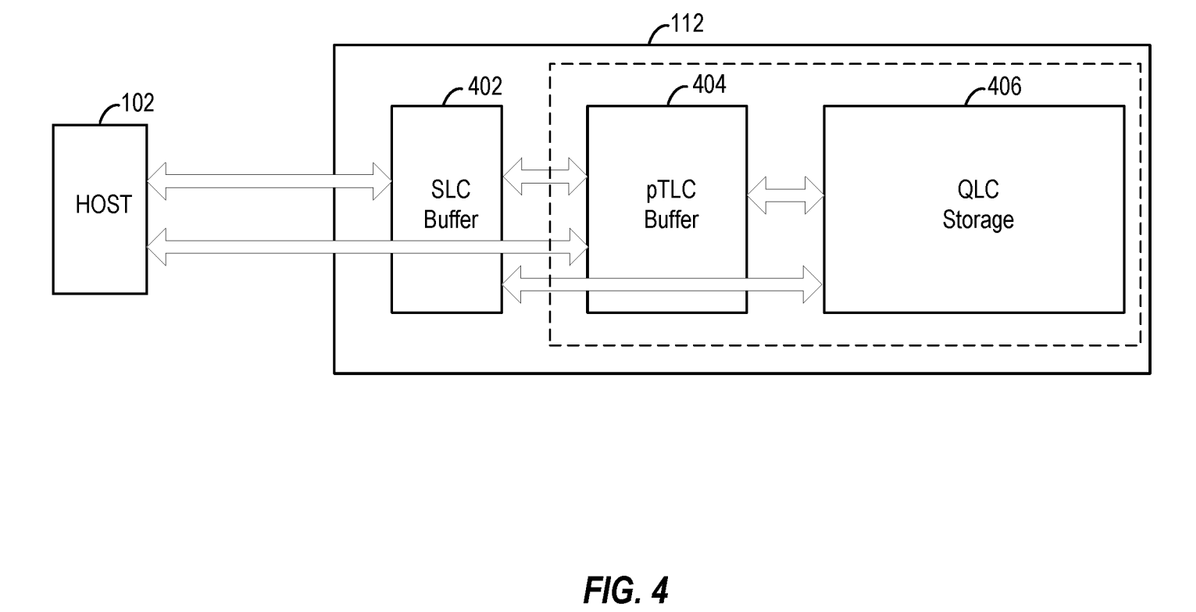
FIG. 4 is a conceptual diagram illustrating an exemplary data path for accessing an NVM in accordance with one embodiment of the disclosure.

FIG. 4 is a conceptual diagram illustrating an exemplary data path for accessing the NVM 112 according to one embodiment. In one example, the NVM 112 is configured to provide an SLC buffer 402, a pseudo TLC (pTLC) buffer 404, and a QLC flash storage 406. The SLC buffer 402 may be a portion (e.g., one or more pages or blocks) of the QLC flash storage 406 configured to operate SLC flash memory for storing 1 bit per cell. In some examples, the SLC buffer 402 may be a flash memory separate from the QLC flash storage 406. The pTLC buffer 404 may be a portion (e.g., one or more pages or blocks) of the QLC flash storage 406 configured to operate in a pTLC mode for storing only 3 bits per cell. By including SLC, pTLC, and QLC flash memory cells, the NVM 112 can provide a data path with cascaded performance. For example, the host 102/controller 108 can write data to the SLC buffer 402 faster than to the pTLC buffer 404 and QLC flash storage 406. The host 102 can write data to the pTLC buffer 404 faster than to the QLC flash storage 406, but slower than to the SLC buffer 402. Therefore, the data path illustrated in FIG. 4 can provide three levels of access speeds when accessing the NVM 112. Therefore, the host may avoid an abrupt performance decrease when switching memory access from the SLC buffer 402 to QLC flash storage 406.

In some examples, the SLC buffer 402 may be used for burst/control data that may benefit from faster access speed (e.g., faster read and write cycles). The SLC buffer 402 may also be used to store data that are frequently accessed by the host. The pTLC buffer 404, which is slower than the SLC buffer 402, may be used for sequential data or less frequently accessed data. The QLC flash storage 406, which is the slowest, may be used to store other data including least frequently accessed data. The controller 108 and/or read-write circuitry 210 can be configured to move or relocate data between the SLC buffer 402, pTLC buffer 404, and QLC flash storage 406.

Figure 5:
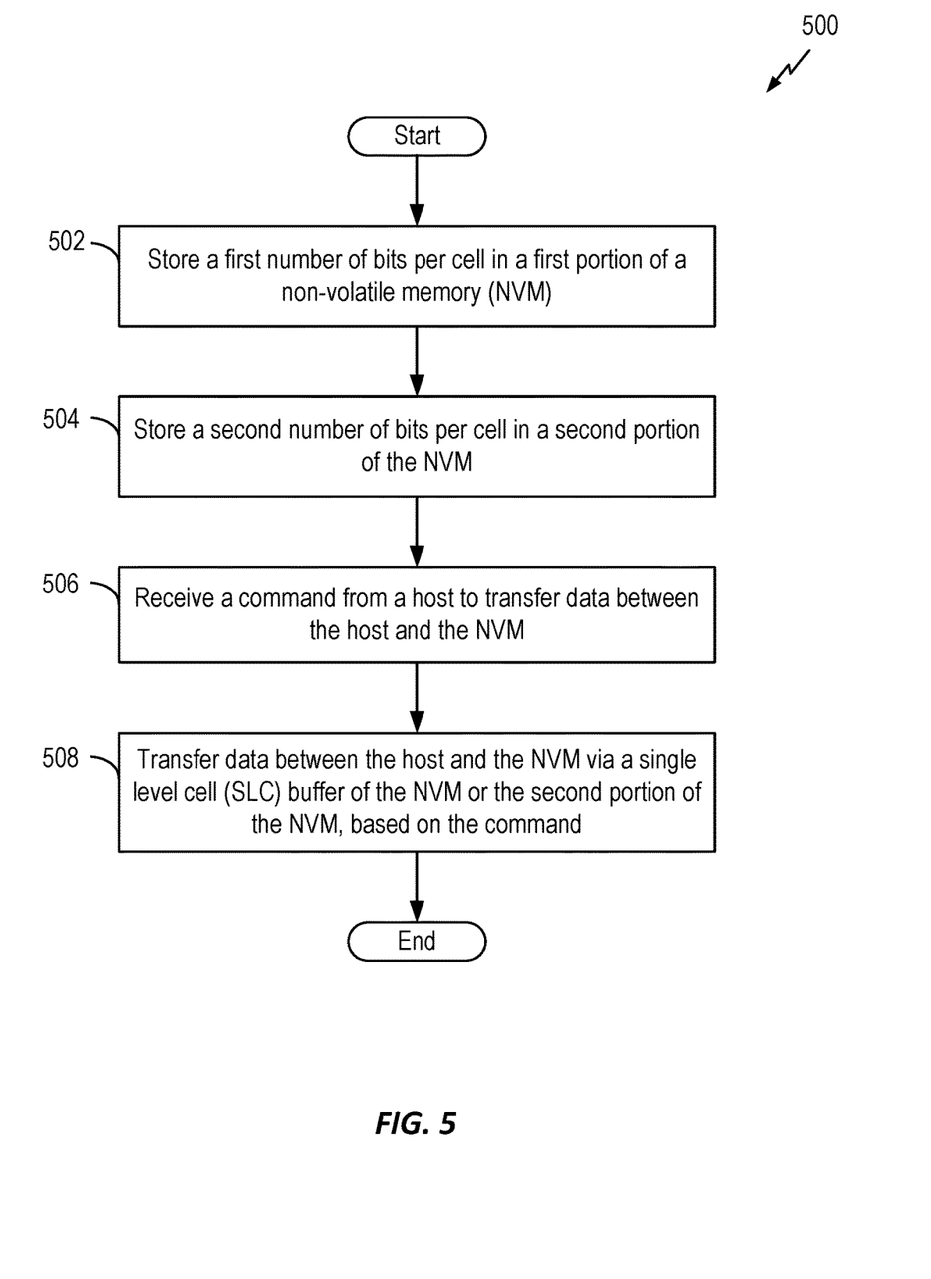
FIG. 5 is a flow chart illustrating a process for operating a solid state drive (SSD) with a cascaded data path in accordance with some embodiments of the disclosure.

FIG. 5 is a flow chart illustrating a process 500 for operating a solid state drive (SSD) 104 with a cascaded data path according to some embodiments. At block 502, the controller 108 may store a first number of bits per cell in a first portion of the NVM 112. At block 504, the controller 108 may store a second number of bits per cell in a second portion of the NVM 112. The second number of bits (e.g., 3 bits per cell) is less than the first number of bits (e.g., 4 bits per cell). The first portion of the NVM 112 may be a portion of the QLC flash storage 406. The QLC flash storage 406 when operated in its native QLC mode can store 4 bits per cell. The second portion of the NVM 112 may be one or more pages or blocks of the QLC flash storage 406 configured to operate in pTLC mode. In pTLC mode, a flash memory cell can store 3 bits per cell. The portion of the QLC flash storage 406 operated in pTLC mode may be called a pTLC buffer (e.g., pTLC buffer 404). In some examples, the read-write circuitry 210 can issue special memory command to configure and operate portions of the QLC flash storage 406 in pTLC mode using fewer threshold voltages. For example, the read-write circuitry 210 may fix or program certain page(s) of the QLC flash storage 406 to predetermined values such that some states of the cells can be ignored when the cells are operated in pTLC mode.

At block 504, the controller 108 may receive a command from the host 102 to transfer data between the host 102 and the NVM 112. For example, the command may include data to be stored in the NVM 112 and/or identify data to be retrieved from the NVM 112. Based on the command from the host 102, the controller 108 may issue corresponding commands to the NVM 112 (e.g., read-write circuitry 210) to perform read, program, and/or erase operations to the NVM 112. At block 506, the controller 108 may transfer data between the host 102 and the NVM 112 via the SLC buffer 402 or pTLC buffer 404 (i.e., the second portion of the NVM 112), based on the command received from the host 102. In one example, the command causes the controller 108 to store data to the NVM 112 using the SLC buffer 402 or pTLC buffer 404. In another example, the command causes the controller 108 to read data from the NVM 112 using the SLC buffer 402 or pTLC buffer 404.

Figure 6:
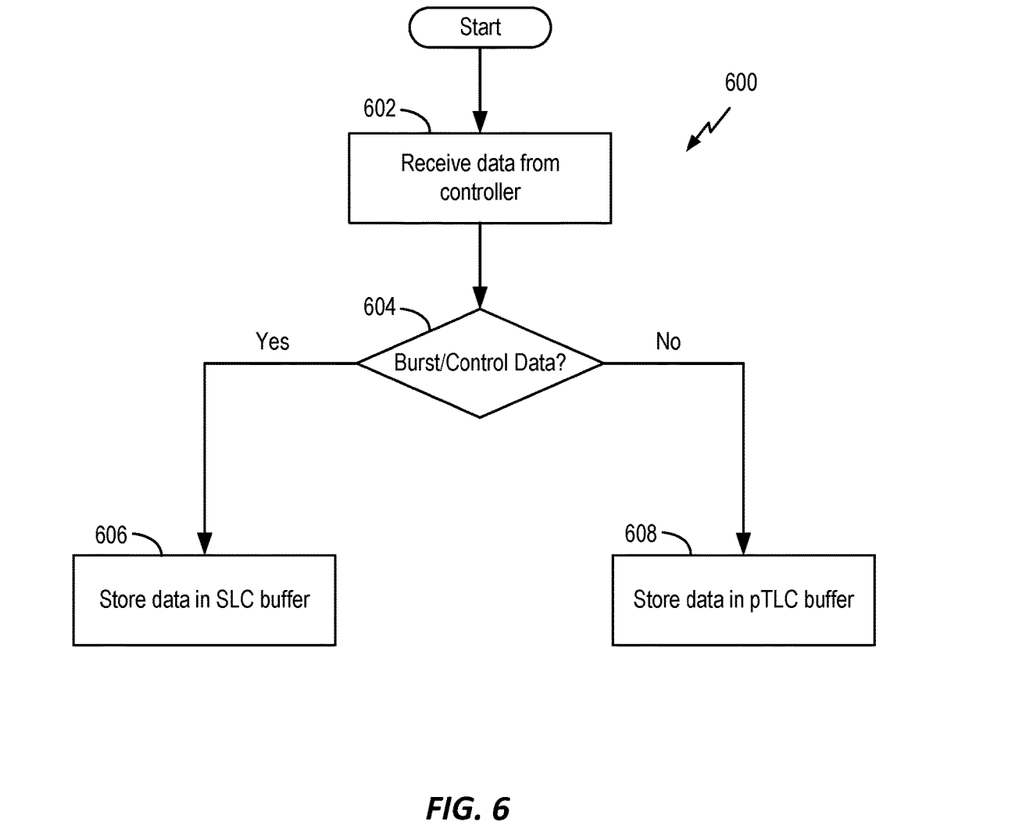
FIG. 6 is a flow chart illustrating a process for storing data in an NVM with a pTLC buffer in accordance with some embodiments of the disclosure.

FIG. 6 is a flow chart illustrating a process 600 for storing data in the NVM 112 with a pTLC buffer according to some embodiments. At block 602, the NVM 112 may receive a command and data from the controller 108 or host 102. The command instructs the NVM 112 to store the data in its non-volatile memory. At decision block 604, the NVM 112 may use its read-write circuitry 210 to determine whether the data is burst/control data or not. If the data is burst/control data, the read-write circuitry 210 may store the data in the SLC buffer 402 (block 606); otherwise, the read-write circuitry 210 may store the data in the pTLC buffer 404 (block 608). It may be desirable to store burst/control data or other frequently accessed data in the SLC buffer 402 because it has faster access time (e.g., shorter read cycle time and write cycle time) than the pTLC buffer 404.

Figure 7:
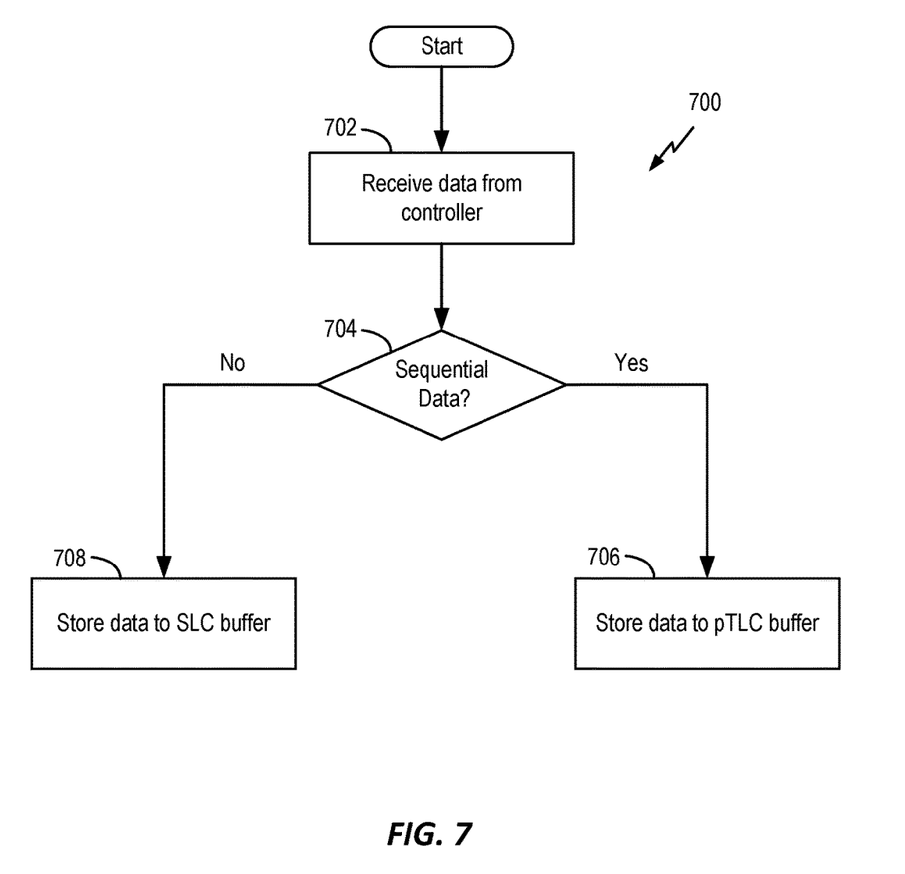
FIG. 7 is a flow chart illustrating another process for storing data in an NVM with a pTLC buffer in accordance with some embodiments of the disclosure.

FIG. 7 is a flow chart illustrating another process 700 for storing data in the NVM 112 with a pTLC buffer according to some embodiments. At block 702, the NVM 112 may receive a command and data from the controller 108 or host 102. The command instructs the NVM 112 to store the data in its non-volatile memory. At decision block 704, the NVM 112 may use its read-write circuitry 210 to determine whether the data is sequential data or not. Sequential data refers to data that are written to consecutive memory locations or addresses. In one example, the NVM may receive a first command that stores data at an address N, a second command that stores data at an address N+1, and a third command that stores data at an address N+2. Sequential data is generally larger in size than burst/control data. The host may send sequential data to the NVM 112 in multiple commands. If the data is sequential data, the read-write circuitry 210 may store the data in the pTLC buffer 404 (block 706); otherwise, the read-write circuitry 210 may store the data in the SLC buffer 402 (block 708). It may be desirable to store sequential data in the pTLC buffer 404 because it has a larger capacity than the SLC buffer 402.

Figure 8:
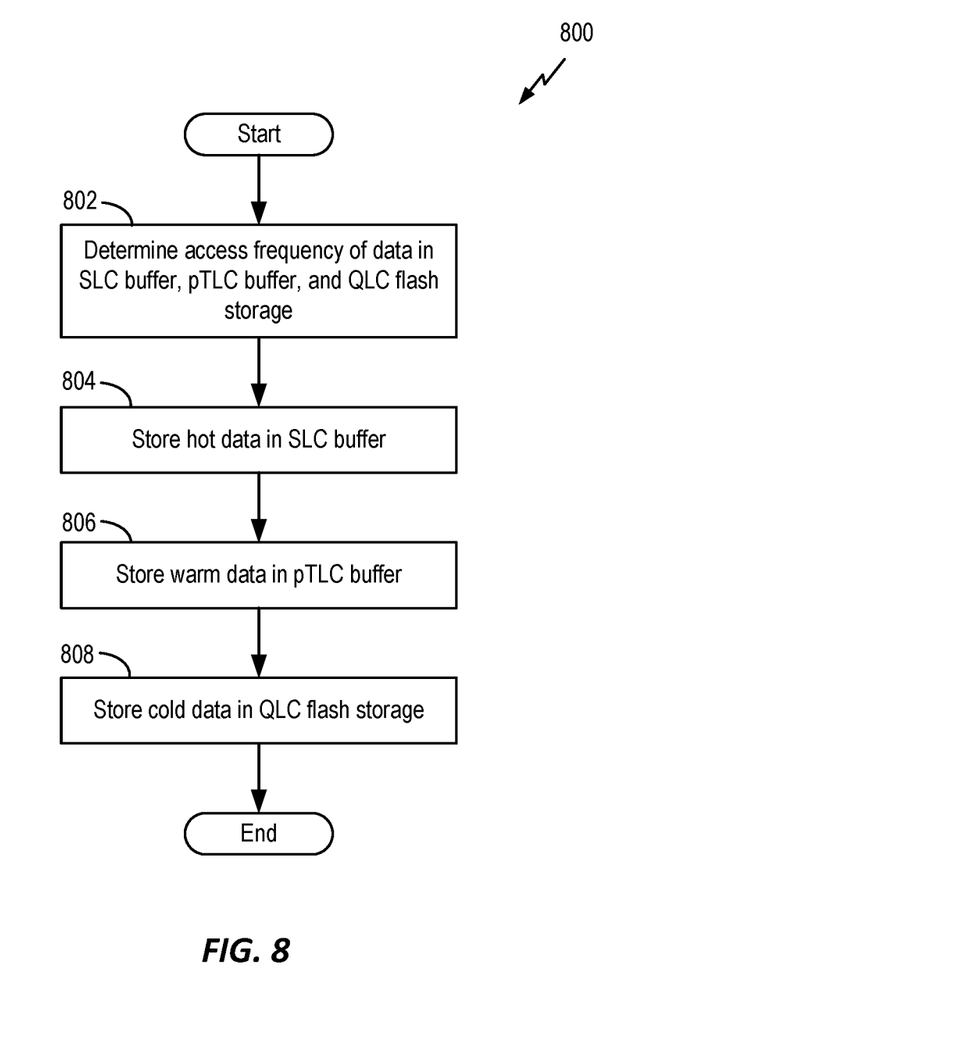
FIG. 8 is a flow chart illustrating a process for relocating data in an NVM in accordance with some embodiments of the disclosure.

FIG. 8 is a flow chart illustrating a process 800 for relocating data in the NVM 112 according to some embodiments. As described above, the controller 180 can access data in the NVM 112 via the SLC buffer 402 and pTLC buffer 404. However, the SLC buffer 402 and pTLC buffer 404 are relatively small in capacity compared to the QLC storage flash 406. Therefore, there may be a need to move data among the SLC buffer 402, pTLC buffer 404, and QLC storage flash 406, for example, when the SLC buffer 402 and/or pTLC buffer 404 is running out of space.

At block 802, the NVM 112 may use the read-write circuitry 210 to determine the access frequency of data stored in the SLC buffer 402, pTLC buffer 404, and QLC flash storage 406. The access frequency denotes how often the data is being accessed (e.g., read or updated by the host). Based on the access frequency, data may fall into three categories: hot, warm, and cold. Hot data is the most frequently accessed, warm data is less frequently accessed, and cold data is the least frequently accessed. For example, the read-write circuitry 210 may determine the access frequency of a page by counting the access cycles of the page occurred in a predetermined period. When the access frequency is below a lower threshold, it may be cold data. When the access frequency is above an upper threshold, it may be hot data. When the access frequency is between the lower and upper thresholds, it may be warm data.

At block 804, the read-write circuitry 210 may store hot data in the SLC buffer 402. To that end, the read-write circuitry 210 can move hot data from the pTLC buffer 404 and/or QLC flash storage 406 to the SLC buffer 402. At block 806, the read-write circuitry 210 may store warm data in the pTLC buffer 404. To that end, the read-write circuitry 210 can move warm data from the SLC buffer 402 and/or QLC flash storage 406 to the pTLC buffer 404. At block 808, the read-write circuitry 210 may store cold data in the QLC flash storage 406. To that end, the read-write circuitry 210 can move cold data from the SLC buffer 402 and/or pTLC buffer 404 to the QLC flash storage 406.

In some embodiments, the read-write circuitry 210 can configure certain pages or blocks of the QLC flash storage 406 to function as the SLC buffer 402 and pTLC buffer 404. In some examples, the read-write circuitry 210 can dynamically adjust the size of the SLC buffer 402 and/or pTLC buffer 404. In some examples, a fixed portion of the QLC flash storage 406 always operate in pTLC mode, while a dynamic block of the QLC flash storage 406 may dynamically switch between QLC mode and pTLC mode as needed.

Figure 9:
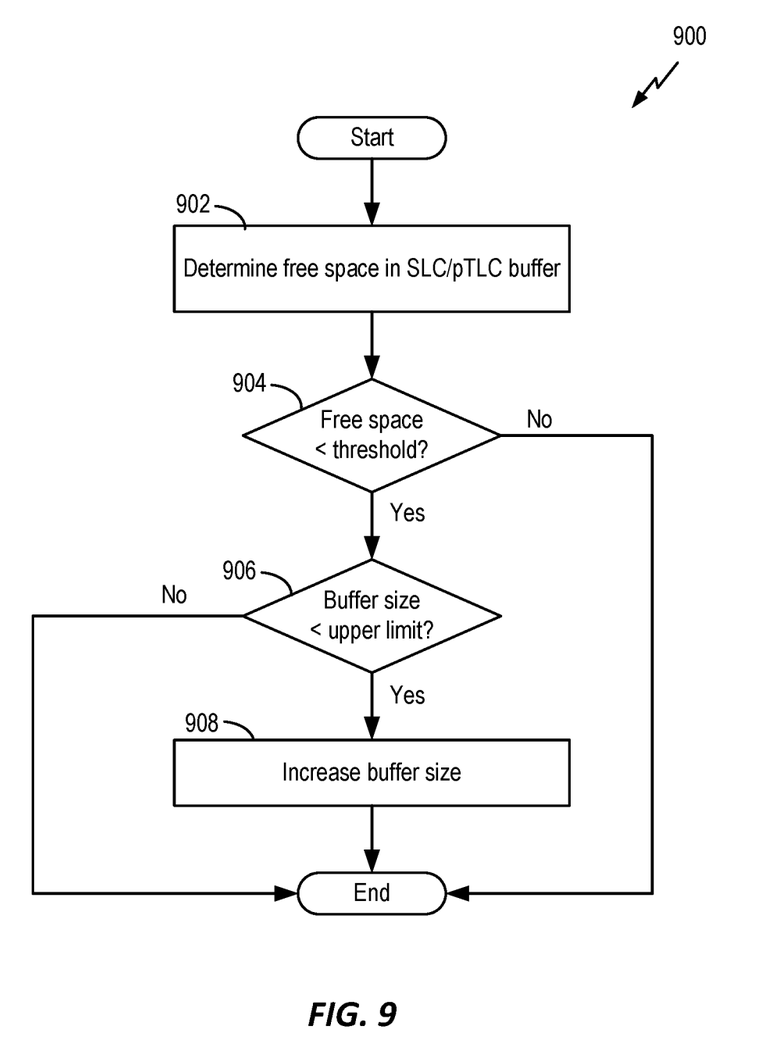
FIG. 9 is a flow chart illustrating a process for adjusting the size of an SLC buffer and a pTLC buffer in accordance with some embodiments of the disclosure.

FIG. 9 is a flow chart illustrating a process 900 for adjusting the size of the SLC buffer 402 and pTLC buffer 404 according to some embodiments. At block 902, the NVM 112 may use the read-write circuitry 210 to determine the free space in the SLC buffer 402 and/or pTLC buffer 404. The free space refers to memory cells of the buffer that have not been used to store actual data. At decision block 904, the read-write circuitry 210 may determine whether the free space is less than a predetermined threshold. For example, the threshold may be a predetermined percent of the size of the buffer or a predetermined number of bytes. If the free space of the buffer is less than the predetermined threshold, the process may proceed to block 906. The SLC buffer 402 and the pTLC buffer 404 may have different free space thresholds. At decision block 906, the read-write circuitry 210 may determine whether the current buffer size is smaller than the upper limit (e.g., maximum buffer size). If the current buffer size is smaller than the upper limit, the read-write circuitry 210 may increase the size of the buffer (block 908).

In some embodiments, a solid state drive (SSD) 104 may include means for performing the functions and processes described above in relation to FIGS. 1-9. For example, the controller 108 and/or read-write circuitry 210 may provide the means for operating a NVM 112 such that a first portion (e.g., QLC flash storage 406) of the NVM 112 stores a first number of bits per cell, and a second portion (e.g., pTLC buffer 404) of the NVM 112 stores a second number of bits per cell less than the first number of bits. The host interface 106, controller 108, and/or read-write circuitry 210 may provide the means for receiving a command from a host to transfer data between the host and the NVM. The host interface 106, controller 108, and/or read-write circuitry 210 may provide the means for transferring data between the host and the NVM 112 via at least one of an SLC buffer 402 or the pTLC buffer 404, based on the command.

While the above description contains many specific embodiments of the invention, these should not be construed as limitations on the scope of the invention, but rather as examples of specific embodiments thereof. Accordingly, the scope of the invention should be determined not by the embodiments illustrated, but by the appended claims and their equivalents.

The various features and processes described above may be used independently of one another, or may be combined in various ways. All possible combinations and sub-combinations are intended to fall within the scope of this disclosure. In addition, certain method, event, state or process blocks may be omitted in some implementations. The methods and processes described herein are also not limited to any particular sequence, and the blocks or states relating thereto can be performed in other sequences that are appropriate. For example, described tasks or events may be performed in an order other than that specifically disclosed, or multiple may be combined in a single block or state. The example tasks or events may be performed in serial, in parallel, or in some other suitable manner Tasks or events may be added to or removed from the disclosed example embodiments. The example systems and components described herein may be configured differently than described. For example, elements may be added to, removed from, or rearranged compared to the disclosed example embodiments.

What is claimed is:

1. A method of operating a solid state device, the method comprising:
   storing cold data in a first portion of a non-volatile memory (NVM) using a first number of bits per cell;
   storing warm data in a second portion of the NVM using a second number of bits per cell, less than the first number of bits, wherein the warm data has a higher access frequency than the cold data;
   storing hot data in a single level cell (SLC) buffer of the NVM, wherein the hot data has a higher access frequency than the warm data;
   receiving a command from a host to transfer data between the host and the NVM;
   transferring data between the host and the NVM via at least one of the SLC buffer of the NVM or the second portion of the NVM, based on the command; and
   dynamically adjusting a size of the second portion of the NVM, comprising:
      determining free space in the second portion of the NVM; and
      if the free space is less than a predetermined threshold, increasing the size of the second portion of the NVM for storing the warm data.

2. The method of claim 1,
   wherein the storing the cold data comprises storing 4 bits per cell in the first portion of the NVM using a quad level cell (QLC) mode, and
   wherein the storing the warm data comprises storing 3 bits per cell in the second portion of the NVM using a pseudo triple-level cell (pTLC) mode.

3. The method of claim 2, wherein the using the pTLC mode comprises:
   fixing a first plurality of memory blocks of the second portion to operate in the pTLC mode; and
   dynamically switching a second plurality of memory blocks of the second portion to operate either in the pTLC mode or the QLC mode.

4. The method of claim 1, further comprising:
   dynamically adjusting a size of the second portion of the NVM relative to a size of the first portion of the NVM.

5. The method of claim 1, further comprising:
   relocating data among the SLC buffer, the first portion of the NVM and the second portion of the NVM, based on an access frequency of the data by the host.

6. The method of claim 5, wherein the relocating data comprises:
   storing most frequently accessed data in the SLC buffer, less frequently accessed data in the second portion of the NVM operated in a pseudo triple-level cell (pTLC) mode, and least frequently accessed data in the first portion of the NVM operated in a quad-level cell (QLC) mode.

7. A solid state device (SSD) comprising:
   a non-volatile memory (NVM) comprising a single level cell (SLC) buffer, and
   a controller operatively coupled to the NVM;
   wherein the controller is configured to:
      store cold data in a first portion of NVM using a first number of bits per cell;
      store warm data in a second portion of the NVM using a second number of bits per cell, less than the first number of bits, wherein the warm data has a higher access frequency than the cold data;
      store hot data in the SLC buffer of the NVM, wherein the hot data has a higher access frequency than the warm data;
      receive a command from a host to transfer data between the host and the NVM;
      transfer data between the host and the NVM via at least one of the SLC buffer or the second portion of the NVM, based on the command; and
      dynamically adjust a size of the second portion of the NVM, comprising:
         determining free space in the second portion of the NVM; and
         if the free space is less than a predetermined threshold, increasing the size of the second portion of the NVM for storing the warm data.

8. The SSD of claim 7, wherein the controller is further configured to:
   store the cold data using 4 bits per cell in the first portion of the NVM using a quad-level cell (QLC) mode, and
   store the warm data using 3 bits per cell in the second portion of the NVM using a pseudo triple-level cell (pTLC) mode.

9. The SSD of claim 8, wherein the controller is further configured to:
   fix a first plurality of memory blocks of the second portion to operate in the pTLC mode; and
   dynamically switch a second plurality of memory blocks of the second portion to operate either in the pTLC mode or the QLC mode.

10. The SSD of claim 7, wherein the controller is further configured to:
    dynamically adjust a size of the second portion of the NVM relative to a size of the first portion of the NVM.

11. The SSD of claim 7, wherein the controller is further configured to:
    relocate data among the SLC buffer, the first portion of the NVM and the second portion of the NVM, based on an access frequency of the data by the host.

12. The SSD of claim 11, wherein the controller is further configured to:
    store most frequently accessed data in the SLC buffer, less frequently accessed data in the second portion of the NVM operated in a pseudo triple-level cell (pTLC)

mode, and least frequently accessed data in the first portion of the NVM operated in a quad-level cell (QLC) mode.

13. A solid state device (SSD) comprising:

means for accessing a non-volatile memory (NVM) comprising a first portion configured to store cold data using a first number of bits per cell, a second portion configured to store warm data using a second number of bits per cell less than the first number of bits, and a single level cell (SLC) buffer configured to store hot data, wherein the warm data has a higher access frequency than the cold data, and the hot data has a higher access frequency than the warm data;

means for receiving a command from a host to transfer data between the host and the NVM;

means for transferring data between the host and the NVM via at least one of the SLC buffer of the NVM or the second portion of the NVM, based on the command; and means for dynamically adjusting a size of the second portion of the NVM, comprising:
  determining free space in the second portion of the NVM; and
  if the free space is less than a predetermined threshold, increasing the size of the second portion of the NVM for storing the warm data.

14. The SSD of claim 13, wherein the means for accessing the NVM comprises:

means for storing the cold data in the first portion of the NVM in a quad-level cell (QLC) mode storing 4 bits per cell, and means for storing the warm data in the second portion of the NVM in a pseudo triple-level cell (pTLC) mode storing 3 bits per cell.

15. The SSD of claim 14, wherein the means for storing the warm data in the second portion of the NVM comprises:

means for fixing a first plurality of memory blocks of the second portion to operate in the pTLC mode; and means for dynamically switching a second plurality of memory blocks of the second portion to operate between the pTLC mode and the QLC mode.

16. The SSD of claim 13, further comprising:

means for dynamically adjusting a size of the second portion of the NVM relative to the first portion of the NVM.

17. The SSD of claim 13, further comprising:

means for relocating data among the SLC buffer, the first portion of the NVM and the second portion of the NVM, based on an access frequency of the data by the host.

18. The SSD of claim 17, wherein the means for relocating data comprises:

means for storing most frequently accessed data in the SLC buffer, less frequently accessed data in the second portion of the NVM operated in a pseudo triple-level cell (pTLC) mode, and least frequently accessed data in the first portion of the NVM operated in a quad-level cell (QLC) mode.

* * * * *